United States Patent [19]

Fujieda et al.

[11] 3,934,567
[45] Jan. 27, 1976

[54] FUEL EVAPORATING DEVICE

[75] Inventors: Mamoru Fujieda, Ibaraki; Teruo Yamauchi, Hitachi; Masakichi Momono, Katsuta, all of Japan

[73] Assignee: Hitachi, Ltd., Japan

[22] Filed: Mar. 27, 1974

[21] Appl. No.: 455,407

[30] Foreign Application Priority Data

Mar. 28, 1973 Japan................................ 48-34589

[52] U.S. Cl. ............................................. 123/122 H
[51] Int. Cl.² .......................................... F02M 31/00
[58] Field of Search...... 123/122 F, 122 H, 122 AC, 123/122 E

[56] References Cited
UNITED STATES PATENTS

| | | | |
|---|---|---|---|
| 1,247,992 | 11/1917 | Nickum............................ | 123/122 F |
| 1,448,008 | 3/1923 | Smith................................ | 123/122 H |
| 2,139,777 | 12/1938 | Skok.................................. | 123/122 F |
| 2,226,011 | 12/1940 | Murphy............................ | 123/122 H |
| 2,372,272 | 3/1945 | Helmore........................... | 123/122 H |
| 3,625,190 | 12/1971 | Boissevair........................ | 123/122 AC |
| 3,738,334 | 6/1973 | Fair................................... | 123/122 E |
| 3,787,037 | 1/1974 | Motooha.......................... | 123/122 F |
| 3,828,747 | 8/1974 | Nambu............................. | 123/122 AC |
| 3,831,568 | 8/1974 | Heimburg........................ | 123/141 |

Primary Examiner—Charles J. Myhre
Assistant Examiner—R. H. Lazarus
Attorney, Agent, or Firm—Craig & Antonelli

[57] ABSTRACT

A fuel evaporating device including: a heating surface which is adapted to enhance the complete evaporation of fuel to be fed to an engine and located in such a position within an air-intake pipe which facilitates the contact of fuel with said heating surface, with its back surface being in contact with an exhaust pipe; and control means having a path leading through said heating surface and a path which bypasses said heating surface, whereby said control means is operated commensurate to operating factors such as a pressure variation in the air intake pipe and the like to control the flow rate of exhaust gas flowing in contact with said heating surface, thus maintaining said heating surface at a temperature optimum for the evaporation of fuel.

6 Claims, 9 Drawing Figures

3,934,567

FUEL EVAPORATING DEVICE

BACKGROUND OF THE INVENTION

This invention relates to a fuel evaporating device adapted for use in the complete evaporation of fuel to be fed to an engine.

In fuel evaporating devices which are now in wide use, the fuel is apt to fail to be atomized completely, with the result that a considerable amount of fuel in a droplet form is fed along the wall surface of an air intake manifold to an engine. Such an incomplete evaporating condition of a mixture gas is not desirable, because such a mixture gas is responsible for atmospheric pollution due to detrimental exhaust gas from an engine. On the other hand, there has been proposed an attempt whereby to utilize the heat of exhaust gas for heating an air intake manifold for the purpose of enhancing the atomization of a mixture gas. However, this attempt suffers from a disadvantage in that, due to its arrangement heating only a part of an air intake pipe, the temperature rise in the exhaust gas due to continuing driving of a car directly leads to a temperature rise in the air intake pipe, such that the temperature of intake air to be fed to an engine is raised, thus lowering the charging efficiency and the efficiency of operation or running of an engine. In addition, uncontrolled heating of an air intake pipe results in neglecting an optimum evaporating temperature of fuel and eventually in hindering satisfactory prevention of atmospheric pollution due to exhaust gases. In addition, in the starting time of an engine, particularly in winter time or in cold districts, the mere use of exhaust gas for heating an air intake pipe will not present a solution to the incomplete evaporation of fuel. Furthermore, the complete evaporation of fuel is mandatory for solving atmospheric polution due to exhaust gas particularly in the case of a lean mixture gas, and it is further required to this end that a mixture of fuel and air be maintained at a constant atomized condition throughout the entire operational range of an engine. It is least true that an attempt to maintain an optimum temperature for the evaporation of fuel has not been proposed, nor has been paid a consideration for the variation in intake pressure during the phases from the starting time to the high speed operating condition of an engine.

SUMMARY OF THE INVENTION

It is accordingly an object of the invention to provide a fuel evaporating device which enables the complete evaporation of fuel throughout the entire operating range of an engine and well accommodates the elimination of detrimental exhaust gases.

It is another object of the invention to provide a fuel evaporating device which may supplement the complete evaporation of a mixture of fuel and air, part of which would not be atomized according to the prior art carburetor, thereby improving the efficiency of operation of an engine, while enabling its operation at a lean air fuel mixture.

It is a further object of the invention to provide a fuel evaporating device which improves the starting characteristics of an engine at the starting time thereof, particularly in winter time or in cold districts, with the attendant purification in exhaust gases.

According to one aspect of the present invention, a heating surface within a fuel evaporating device is maintained to a temperature optimum for evaporation of fuel, i.e., at nuclear boiling condition, commensurate to the air intake pressure or the operating conditions of an engine, by controlling to an optimum level the flow rate of exhaust gases to be fed to the aforesaid fuel heating surface (on the side of an air intake manifold).

According to another aspect of the present invention, there is provided a heating means underside of the fuel heating surface, thereby improving the starting characteristics of an engine as well as the purifying efficiency of exhaust gases, while the flow rate of exhaust gas to be fed to the fuel heating surface, i.e., the temperature at the fuel heating surface may be controlled to an optimum level.

DESCRIPTION OF THE PREFERRED EMBODIMENTS

Figure 3:
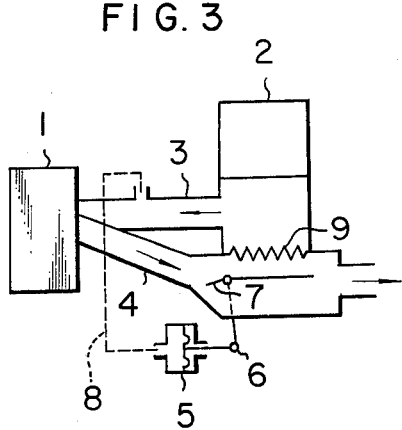
FIG. 3 is a schematic diagram of a fuel evaporating device embodying the present invention.

Referring to FIG. 3, shown at 1 is an engine, at 2 a carburetor, at 3 an air intake pipe through which to feed completely evaporated fuel to an engine, at 4 an exhaust pipe and at 5 a diaphragm, one side of which communicates by way of pipes with the air intake pipe for sensing an intake pressure and the other side of which is connected by way of linkage 6 to a control means 7 for controlling the flow rate of exhaust gas. (This control means 7 will be referred to as a baffle, hereinafter.) The baffle 7 is positioned within the exhaust pipe 4 and adapted to be operated counterbalancing to the intake pressure with the aid of the aforesaid diaphragm 5 and pipe 8, thereby controlling the quantity of exhaust gas to be directly discharged to atmosphere as well as the quantity of exhaust gas to be led to the heating plate 9. The heating plate 9 is located below the carburetor 2 and bounded the air intake pipe and exhaust gas pipe for being heated by exhaust gas to an optimum temperature for the complete atomization of the introduced mixture of gas over the entire range of operation of an engine.

Figure 1:
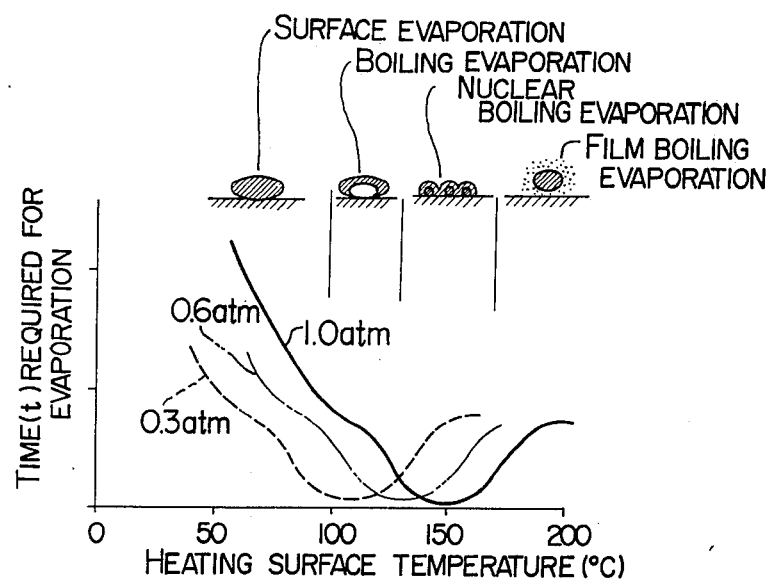
FIG. 1 is a plot illustrating the relationship between the temperature at a fuel heating surface and a time required for evaporation of fuel.

Before proceeding with the description on the operation of the device thus arranged, the reference will be made to FIG. 1 illustrating the relationship between evaporation time of fuel and temperature at heating surface which relationship has been obtained by experiments. In terms of 1 atmospheric pressure, the time required for evaporation of gasoline becomes shorter with the temperature rise and presents a minimum value at a temperature of about 150°C at the heating surface. When the temperature is further raised, the evaporation time of gasoline will be further extended. The evaporating condition of gasoline is such that there will be developed no gasoline vapor at a temperature of below about 100°C from gasoline droplets and hence the gasoline will be evaporated only from surfaces of droplets. In the evaporating temperature range from 100° to 130°C, gasoline vapor will be developed from inside of the gasoline droplets, while in the range from 130° to 170°C, a lot of foam will be developed within droplets, presenting a so called nuclear boiling, i.e., the most vigorously evaporating condition or maximum evaporating rate. If temperature is raised over the nuclear boiling point, the droplets will be lifted up from the heating surface due to the generation of vapor, thereby hindering thermal transmission from the heating surface, thus presenting a so called film boiling condition, with the resulting lowered evaporation rate. The range of the most vigorous evaporation is between 130°C and 170°C, particularly between 140°C and 160°C. Meanwhile, in the case of the pressure being 0.3 atm., the evaporating condition at 1 atm. will be shifted in parallel towards a lower temperature side on the heating surface. This is due to the variation in evaporating temperature which is the function of pressure variation. Thus, the optimum temperature for the heating surface at this atmospheric pressure is about 90° to 130°C.

Figure 2:
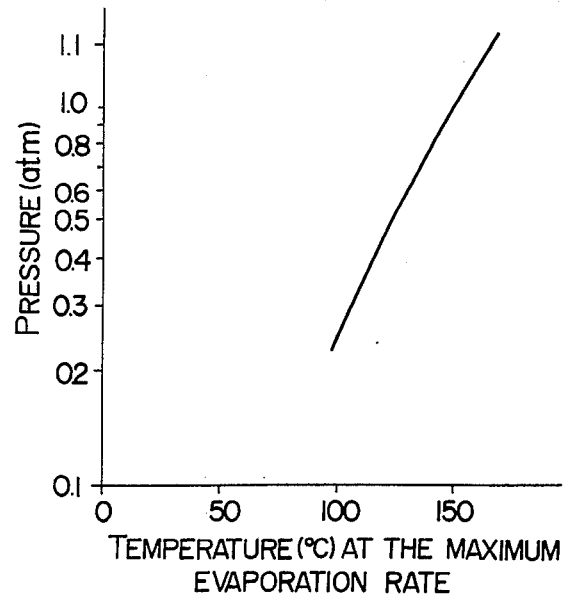
FIG. 2 is a plot showing the relationship between temperature and pressure at the maximum evaporating rate of fuel.
Figure 4:
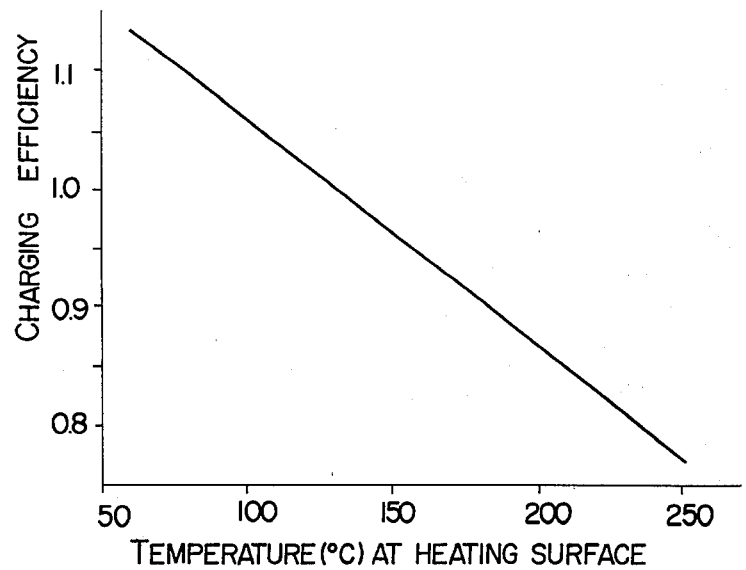
FIG. 4 is a plot showing the relationship of the charging efficiency to temperature at a heating portion.

The present invention is based on the results of the aforesaid experiments given for the optimum evaporating temperature of gasoline. More particularly, the mixture of fuel and air is introduced from a carburetor by way of air intake pipe 3 into engine 1 and then discharged through the exhaust pipe 4 as exhaust gas. The fuel which has failed to be atomized in the carburetor will impinge on the heating plate 9 provided below the carburetor 2 for rapid evaporation thereat. The baffle 7 within the exhaust pipe 4 is set to such an opening angle that the temperature at the heating plate will be about 110°C as shown in FIG. 1, under the intake pressure of 0.3 atm. at the time of idling of an engine. As the number of revolution of an engine is increased, the gasoline evaporating temperature will be increased. To maintain the temperature optimum for such a variation, the intake pressure is transmitted by way of a diaphragm or the like to the baffle 7, such that the temperature at the heating surface may be automatically adjusted for pressure variation. In other words, the angle of baffle is varied according to pressure variation, while the temperature at the heating plate may be controlled to an optimum temperature by controlling the quantity of exhaust gas. The characteristics of the diaphragm 5 and link 6 are predetermined so as to vary the angle of the baffle 7 in an attempt to maintain the temperature at the heating plate 9 to about 150°C, when the intake pressure becomes close to an atmospheric pressure. With the increase in quantity of the mixture of fuel and air, the heat required for evaporation will be increased, and at the same time the temperature of exhaust gas will be raised, such that the heat required for evaporation may be supplied sufficiently. Conversely, with the decrease in quantity of a mixture of fuel and air, the intake pressure will be lowered and the angle of baffle 7 will be varied, with the accompanied decrease in the temperature at the heating plate 9, such that the temperature at the heating plate may be maintained to the maximum evaporating rate. FIG. 2 illustrates the relationship between the temperature and the pressure at the maximum evaporating rate. In general, since an automobile is mostly driven in the range of the intake pressure of 0.3 to 1.0 atm., it is recommendable to control the temperature so as to fall in the range from 110° to 150°C which is optimum for 0.6 atm. On the other hand, the time required for evaporation of gasoline is shortened, as the temperature is raised. However, as can be seen from FIG. 4, the rise in temperature at the heating portion results in lowering of the charging efficiency of the fuel-air mixture, and thus such temperature rise is not recommendable. Accordingly, it is imperative that, as in the present invention, the decrease in the density of a mixture gas be minimized and the temperature at the heating plate be set to an optimum range from 110° to 150°C, considering the operating conditions of an engine. For maintaining the temperature at the heating surface within the aforesaid temperature range, a temperature detecting means may be provided in the neighborhood of the heating surface to thereby control the temperature at the heating plate.

Figure 5:
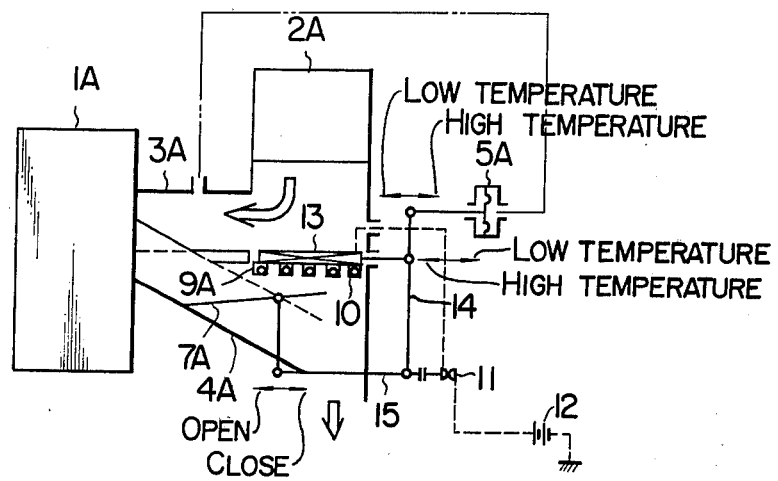
FIG. 5 is a schematic diagram showing another embodiment of the invention.

FIG. 5 shows a further embodiment of the present invention, similar to that shown in FIG. 3, except that an electric heating means such as a heater is provided in the heating portion adapted to completely evaporate the fuel introduced under suction within a carburetor maintained at the low temperature at the starting time of an engine, while the heating factor and the air intake pressure factor are correlated with the opening angle of a baffle which in turn is correlated with an electric power source of the heating means as well as with the actuation of a switch, thereby achieving the desired purification of exhaust gas over a wide operating range of an engine. Shown at 9A is a heating plate serving as a partition wall between the air intake pipe 3A and an exhaust pipe 4A, with electric heating means 10 being attached thereto. The electric heating means 10 is connected by way of electric contacts 11 to an electric power source 12. Shown at 13 is a heat sensitive member such as a bi-metal of a spiral form, with its center being affixed to the heating plate 9A, for the purpose of detecting the temperature at heating plate 9A. The shape of a heat sensitive member may be of a bar or the like. However, the heat sensitive member of a spiral form is preferred, because of its large heat sensitive area and hence the resulting improved performance. Shown at 5A is a diaphragm connected to the air intake 3A, at 14 a lever connecting with a diaphragm 5A and spiral bi-metal 13, and the lever 14 is adapted to transmit various factors to a lever 15. The lever 15 is adapted to transmit the movement of the lever 14 to the baffle 7A and to open or close the electric contacts 11, in cooperation with the movement of baffle 7A.

In operation of the device according to the present invention, the heating plate 9 is heated by means of electric heating means 10 at the starting time of an engine, while the lever 14 and diaphragm 5A are in the 'high' temperature position and the spiral bimetal 13 is in the 'low' temperature position, with the baffle 7A being closed. Upon starting of an engine, the intake pressure and temperature at the heating plate 9A will be raised, then the baffle 7A will be opened due to the relationship between the preset diaphragm 5A and the spiral bi-metal 13, the electric contacts opened and the electric heating means 10 disconnected from the electric power source 12. When the intake pressure is further raised, (The flow rate of a mixture gas into a carburetor 2A is increased.) the diaphragm 5A is moved to a high temperature position, with the spiral bi-metal being used as a fulcrum, so as to close the baffle 7A, whereby the quantity of exhaust gas impinging on the heating plate 9A will be increased, with the resulting increase in temperature at the heating plate 9A. When the temperature at the heating plate 9A is raised, then the spiral bi-metal 13 will move to the 'high' temperature position, with the diaphragm 5A being used as a fulcrum, thereby opening and balancing the baffle 7A, when the temperature at the heating plate 9A becomes higher than that before the intake pressure has been raised. This off-set amount in temperature is utilized to vary the setting point of a temperature commensurate to the variation in intake pressure. In this respect, it is safe to consider that the intake pressure is in proportion to the quantity of a mixturee gas, except for transient conditions. Thus, the aforesaid requirement is satisfied, i.e., the temperature is maintained lower in the case of a low intake pressure, while the temperature is maintained higher in the case of higher intake pressure. Thus, the characteristics required in the complete evaporation of fuel is satisfied by setting the off-set amount of the temperature due to the variation in intake pressure to a range from 100° to 150°C.

Alternatively, it would be advantageous for better performance of an engine, if a heat insulating member is placed between the heating plate and air intake pipe for preventing the temperature rise in the air intake pipe at the high speed drive or if an intake pipe is separated from the exhaust pipe. According to the description given thus far, the quantity of the exhaust gas, i.e., the temperature at the heating plate is controlled commensurate to the variation in intake pressure. However, the number or revolution of the engine or exhaust gas pressure may be used in its place. In other words, any factor may be used, as far as it is representative of the operating condition of an engine and can maintain the temperature at the heating plate to an optimum temperature for evaporation of fuel.

Figure 6:
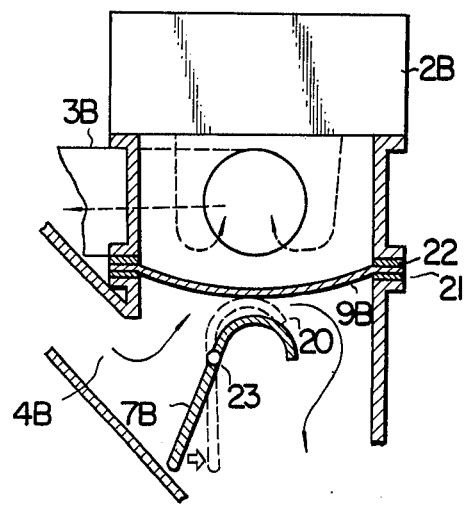
FIGS. 6, 7, 8 and 9 are diagrams showing further embodiments having evaporation-accelerating device for fuel.

FIG. 6 shows a further embodiment of the present invention, in which the upper portion of the baffle 7B is of a venturi form to increase the flow speed of the mixture gas, while reducing the pressure loss and exhaust gas resistance by providing divergent space defined between the heating plate 9B and the baffle 7B, with the resulting improvement in the heat transmitting characteristic of the exhaust gas to the heating plate 9B. Like reference numerals shown designate like parts as shown in the previous embodiment. Shown at 20 is a venturi portion, at 21 and 22 heat insulating members and at 23 a movable shaft.

The exhaust gas discharged from an engine (shown by arrows in solid lines) is guided by the baffle provided in the exhaust gas passage 4B towards the heating plate 9B to thereby supply the heat thereto, after which the exhaust gas will be discharged externally. The provision of a venturi portion defined by the baffle 7B and heating plate 9B improves the heat transmission of exhaust gas to the heating plate due to the accelerated flow speed of the gas and provides smooth pressure recovery of the exhaust gas to thereby reduce its pressure loss. The baffle 7B is opened in a direction shown by a blank arrow about the movable shaft 23 to adjust the heat to be fed to the heating plate. In this respect, the shape of the venturi is only varied, with the construction of the baffle remaining unchanged. Although the driving manner of the movable shaft 23 is not shown, it may be operated by way of a temperature detecting means using an intake pressure or by way of a heat sensitive member as in the previous embodiments. In the embodiment shown, the venturi portion is defined by the heating plate and baffle. Alternatively, the heating plate in the form of a flat plate may be used in combination with a baffle having a curvature to form the venturi portion.

Figure 7:
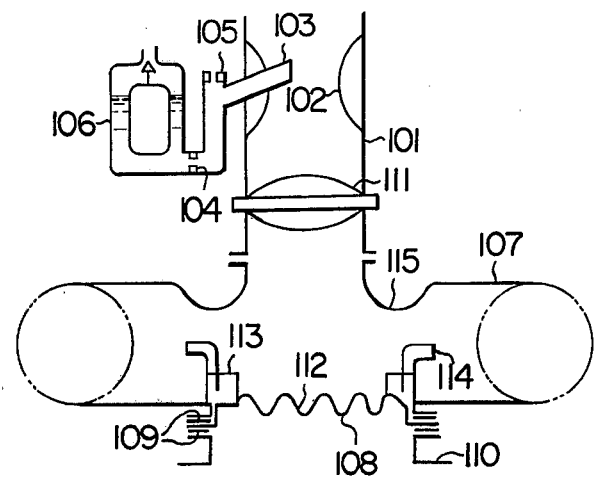
Figure 8:
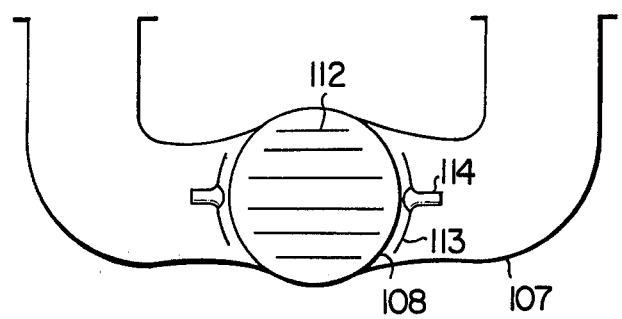
Figure 9:
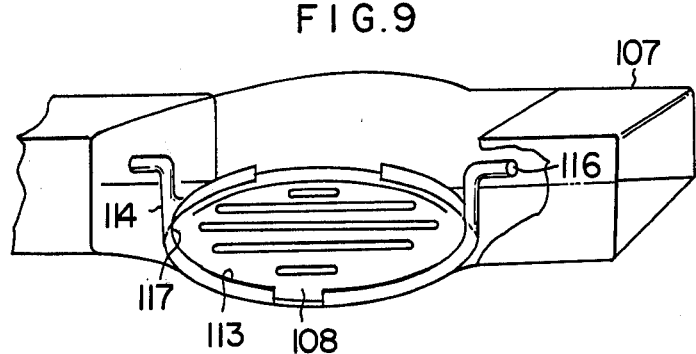

FIGS. 7, 8 and 9 show still further embodiments of the invention, in which the complete evaporation of fuel and uniform mixing of a fuel gas with intake air may be achieved. More particularly, the fuel gas evaporated at the heating plate is collected, by utilizing air flow, into the center portion of an air intake manifold to subject the mixture of fuel air thus obtained to turbulence and diffusion, thereby obtaining uniform fuel and air mixture. A guide vane is provided in the vicinity of the outer periphery of a heating plate to collect the evaporated gas flow thereat which is then introduced from the wall surface of the air intake manifold to the center portion thereof to be injected from the center portion into the intake air flow. This provides uniform mixing of the intake air with the evaporated fuel.

Referring to FIG. 7, shown at 101 is a carburetor, at 102 a venturi, at 103 a nozzle, at 104 a jet, at 105 an air bleed jet, at 106 a float chamber, at 107 an air intake manifold, and at 108 a heating plate which is attached to the branched portion of the air intake manifold 107 located in a position such as to facilitate the efficient impingement of the un-evaporated part of fuel from the carburetor upon the top surface of the heating plate 108. The area of the heating plate is greater than the projected area of the outlet of the carburetor 101, thereby allowing all of the un-evaporated fuel from the carburetor to impinge on the heating plate. The underside of the heating plate 108 is exposed to the exhaust gas and the flow of exhaust gas is controlled by means of a baffle plate. The heating plate 108 is heated to a temperature of about 150°C on the surface thereof by the heat of exhaust gas. The thickness of the heating plate should be preferably as small as possible, from viewpoint of its thermal capacity and the starting of an engine at a low temperature. However, the thickness thereof is usually selected to 0.6 to 1.2 mm, considering the endurance or service life thereof. Shown at 109 is a heat insulating plate, at 110 an exhaust gas manifold, at 111 a throttle valve, at 112 grooves defined in the surface of the heating plate 8, said grooves being adapted to control the flow of the fluid which has impinged on the heating plate 108 and to enlarge the heat transmitting area thereof. Shown at 113 is guide vanes running along the circumference of the heating plate 108.

The height of guide vanes should be such as to collect the flow of the fuel gas which has been evaporated at the heating plate 108, usually several tens milimeters. Provided along the center line of the guide vane 113 are gas nozzles 114. The evaporated fuel gas flows collected along the guide vanes are then injected through gas nozzle 114 to the left and right towards the center of the air intake manifolds, respectively. In this respect, if the shape of a guide vane is selected suitably, then the use of the gas nozzle 114 may be avoided. The corner between the carburetor and air intake manifold connected to the aforesaid carburetor is rounded as shown in FIG. 7, such that intake air is accelerated thereat, thereby mixing with the evaporated fuel gas from the gas nozzle 114. The diameter of the gas nozzle 114 is several milimeters, while the fluid resistance may be neglected in the practical use. On the other hand, the inlet of the carburetor and inlet of the air intake manifold are formed wih bell mouths 115, whereby the fluid flow may be branched uniformly, thereby preventing the vigorous impingement of the intake air on the heating plate.

As shown in FIG. 7, part of the fuel gas from the nozzle 103 of a carburetor is evaporated before reaching the heating plate 108 and mixed with intake air, then through an air intake manifold 107 and fed into an engine. The part of the fuel, which has not evaporated, then impinges on the heating plate 108, is evaporated thereat, then collected by means of guide vanes and injected through gas nozzles 114 into the intake air flow for mixing. It follows that the intake air is mixed with fuel completely, before entering an engine. The grooves 112 aid in collection of exhaust gas along the guide vanes 113. The part of fuel, which is relatively heavier, tends to flow along the grooves 112 for evaporation and then impinges on the guide vanes 113 and is collected in the center portion, followed by injection through the nozzles 114 into mixture gas. Accordingly, no part of fuel in the un-evaporated condition will flow outside the guide vanes 113.

FIG. 9 shows one embodiment of guide vanes 113 and gas nozzles 114. The injection ports 116 of the gas nozzles 114 are open to the center portions of the air intake manifolds 107 extending in the opposite directions. The collecting portions in the inlets of the gas nozzles 114 are of a smooth bell mouth shape, thereby presenting a smooth flow path from guide vanes to the injection ports 116 in the gas nozzles 114. The size of the collecting portion should be such as to permit the collection of the evaporated fuel attaching to the guide vanes along the guide vanes 114. The height of guide vane 113, the size of collecting portion 117, the dimensions of gas nozzle 114 may all be suitably selected according to the constructions of the heating plate 108 and air intake manifold 107.

Alternatively, the guide vane may be such that the height of its portion adjacent to the center portion of the air intake manifold is greater than those of the side portions thereof. In either case, the shape of the guide vane should be such as not to increase the absorbing resistance of the fluid flow to an undesired extent. In addition, the guide vanes may be formed integrally with the heating plate.

As is apparent from the foregoing description, the fuel may be atomized before entering an engine, and in addition the thus atomized fuel may be completely mixed with intake air, thus achieving uniform mixing and homogenization, thereby preventing the variation in the mixing ratio. This in turn increases the ignition missing limit of air fuel ratio to 23 to 26, with the resulting reduction in nitrogen oxide concentration from 500 ppm to 50 ppm.

In passing, the heating source used is not limited to the hot exhaust gas from an engine, but may be other heat source such as cooling water for an engine or electric heating means. Furthermore, the shape of grooves or fins formed in or on the heating plate may be any shape, as far as they are well adapted for the shape and construction of a carburetor. The guide vane is also of any shape as far as they may be adapted for effectively collecting the fuel vapor there along, i.e., may be those having a plurality of fins, grooves or in the form of pipes.

According to the present invention, the relationship between the fuel evaporating rate at the heating surface and the temperature at the heating surface is clarified by experiments, while the temperature at the heating plate is compensated by using an intake pressure, to improve the responsive characteristic thereof for causing rapid evaporation of fuel. In addition, this permits the complete evaporation of fuel and uniform mixing of intake air with evaporated fuel gas, thereby enabling the engine-running in a lean mixture range, with the resulting excellent effect in the purification of exhaust gas from an engine.

What is claimed is:

1. A fuel evaporating device comprising heating means provided in an air intake pipe of an internal combustion engine and arranged such that the fuel contacts a surface of said heating means; means located in the vicinity of said heating means for detecting the temperature of said heating means and maintaining the temperature of said heating means substantially constant; means for detecting the negative suction pressure of the internal combustion engine; and means for varying the temperature at which said heating means is set in relation to the output of said negative suction pressure detecting means, whereby the temperature at which said heating means is set is lowered as the negative suction pressure rises.

2. A fuel evaporating device as set forth in claim 1, wherein said heating means comprises a heating plate exposed on said surface to the air intake pipe and on another surface to an exhaust gas passageway, and baffle means whose position is varied in relation to the output of said temperature detecting means for causing exhaust gases to be deflected away from the directed against said heating plate according to the operating conditions of the internal combustion engine.

3. A fuel evaporating device as set forth in claim 1, wherein said negative suction pressure detecting means sets the temperature of said heating means such that the temperature is set higher as the negative suction pressure increases and is set lower as the negative suction pressure decreases, the temperature of said heating means being maintained in a range between 110° C and 150° C.

4. A fuel evaporating device as set forth in claim 2, wherein said baffle means and the surface of said heating plate exposed to the exhaust gas passageway define a venturi section in the path of exhaust gas from the internal combustion engine.

5. A fuel evaporating device as set forth in claim 2, wherein guide vane means are provided in the vicinity of the outer periphery of said heating plate for collecting evaporated gas flow and injecting the gas flow into intake air flow for uniform mixing.

6. A fuel evaporating device as set forth in claim 5, wherein said guide vane means include nozzle means for discharging evaporated fuel in the axial direction of the air intake passage.

* * * * *